July 2, 1946.　　　　R. L. MOREY　　　　2,403,389
FLEXIBLE GEAR COUPLING ARRANGEMENT
Filed April 21, 1944
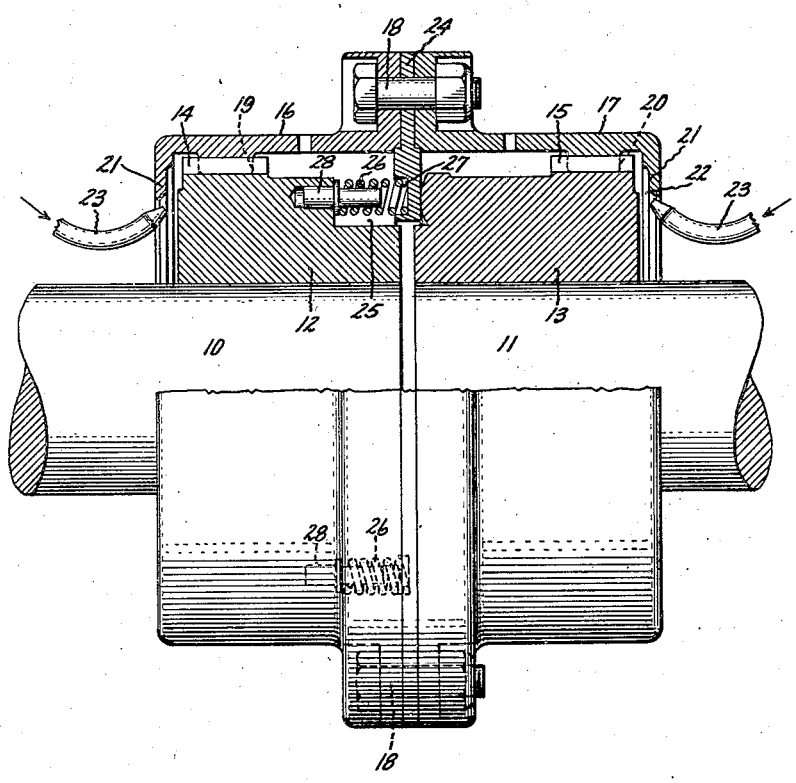
Inventor:
Robert L. Morey,
by Harry E. Dunham
His Attorney.

Patented July 2, 1946

2,403,389

UNITED STATES PATENT OFFICE 2,403,389

FLEXIBLE GEAR COUPLING ARRANGEMENT

Robert L. Morey, Swampscott, Mass., assignor to General Electric Company, a corporation of New York Application April 21, 1944, Serial No. 532,059

3 Claims. (Cl. 64—9)

The present invention relates to flexible gear coupling arrangements of the type comprising two externally toothed gears secured to adjacent ends of substantially aligned shafts and an internally toothed gear or shell meshing with the gears and transmitting torque between them. To facilitate lubrication it is customary in many designs to provide the internally toothed gear or shell with oil retaining lips at its ends. Difficulties have been experienced heretofore due to relative axial movement between the gears and the shell causing rubbing of the lips on the end faces of the gears, resulting in intermittent pounding as the shell is alternately forced away from the end face of a gear and slides back into contact again during rotation of the coupling. This takes place especially at light loads. Under heavy load conditions the shell may be forced tightly against the end face or hub of a gear in which case the coupling loses much of its flexibility. Also, the continued contact between a lip of the shell and the hub of a gear may seriously affect and interfere with the lubrication of the gear.

The object of my invention is to provide an improved construction of flexible gear coupling arrangement whereby the aforementioned difficulties are substantially minimized. This is accomplished in accordance with my invention by the provision of means for centering the internal gear or shell on the external gears. The centering means are preferably in the form of a disk or like member securely attached to the shell and projecting between the gears with one side directly contacting the end face of one of the gears and the other side yieldingly connected to the other gear by means of a spring.

For a better understanding of what I believe to be novel and my invention, attention is directed to the following description and the claims appended thereto in connection with the accompanying drawing.

The single figure of the drawing illustrates a flexible gear coupling embodying my invention.

The arrangement comprises two substantially aligned shafts having end portions 10 and 11 and being subjected to relative axial and angular movements. These shafts or shaft portions are connected by a flexible gear coupling which comprises two external gears 12 and 13 securely fastened to the shaft portions 10 and 11 respectively. Each gear has a row of circumferentially spaced external teeth 14 and 15 respectively. Torque is transmitted between the rows of teeth 14 and 15 by means of an internally toothed gear or shell which in the present instance comprises two halves 16 and 17 having flanges secured together by bolts 18. The shell half 16 has a row of teeth 19 meshing with the teeth 14 of the gear 12 and the shell half 17 has a row of internal teeth 20 meshing with the teeth 15 of the gear 13. The opposite ends of the shell are provided with inwardly extending lips 21 facing the adjacent end faces or hubs of the gears 12 and 13 respectively and in center position forming annular clearances 22 therewith. Lubricant, such as oil, under pressure may be supplied to the cooperating teeth of the gears by means including suitable nozzles 23 arranged to direct lubricant through the clearances 22 towards the teeth.

The arrangement so far described is typical of flexible gear coupling designs. During operation, torque may be transmitted from the shaft 10 to the gear 12 and from the gear 12 through the internally toothed shell 16, 17 to the gear 13 and finally to the shaft 11.

According to my invention, means are provided to maintain the shell centered with regard to the gears, that is, to reduce axial travel of the shell relative to the gears in order to prevent the lips 21 from contacting the end faces or hubs of the respective gears. The centering means comprises a plate 24 securely held between the flanged halves of the shell and having an inner portion projecting between the gears 12, 13. One side of the plate contacts or engages directly the end face or hub of the gear 13. This end face in the present example is ball-shaped; more specifically, the end face is machined to form part of a toroidal surface. The centering plate 24 restrains axial movement of the shell in one direction. In the present instance the shell is prevented from traveling towards the right relative to the gear 13 due to the direct contact of the centering plate and the gear 13.

The other side of the plate 18 engages yieldingly the gear 12. To this end the gear is provided with an annular recess 25 accommodating a plurality of circumferentially spaced compression springs 26 having a right-hand end located in a recess 27 of the plate 18 and a left-hand end portion supported on a shouldered pin 28 secured to the gear 12. It is desirable to provide springs on one side only because otherwise conditions might be encountered where the axial impulses would coincide with the natural frequencies of the springs and thereby build up a violent shuttling action. The omission of springs altogether, on the other hand, would eliminate axial freedom of the shafts and when the shafts moved apart the plate would be out of contact with the hubs. As there is likely to be a constant fore and aft movement of the shafts, a chattering of the plate against the hubs would result. With the provision of yieldable connecting means in the form of springs on one side of the centering plate, the latter is maintained in continuous contact with one of the gears.

During operation, movement of the gear 13 towards the left is transmitted through the centering plate 24 to the shell and causes the latter to move along with the gear 13. Likewise, movement of the gear 13 towards the right causes similar movement of the shell by action of the biasing springs 26.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Flexible gear coupling arrangement comprising two gears each having a row of teeth, a shell having internal teeth meshing with said rows of teeth, and means for centering the shell on the gears comprising a plate secured to the shell and having one side contacting the end face of the first gear and resilient means arranged between the other side of the plate and the second gear so as to bias the plate into yielding engagement with the end face of said first gear.

2. Flexible gear coupling arrangement comprising two gears each having a row of teeth, a shell having internal teeth meshing with said rows of teeth, and means for centering the shell on the gears comprising a plate secured to a central portion of the shell and projecting between the gears, one of the gears having a toroidal end surface engaging one side of the plate and a plurality of circumferentially spaced springs between the other side of the plate and the other gear.

3. Flexible gear coupling arrangement comprising two shafts having substantially aligned end portions subject to relative axial and angular movements, a separate external gear secured to each end portion, a shell having two flanged halves secured together, each half having a row of internal teeth meshing with one of the gears, and means for reducing relative axial travel between the shell and the gears comprising a plate securely held between the flanged halves and projecting between the gears, one side of the plate engaging an end face of one of the gears and spring means between the other side of the plate and the end face of the other gear.

ROBERT L. MOREY.